(12) United States Patent
Adams

(10) Patent No.: US 7,326,377 B2
(45) Date of Patent: Feb. 5, 2008

(54) SOLID-FREE-FORM FABRICATION PROCESS AND APPARATUS INCLUDING IN-PROCESS WORKPIECE COOLING

(75) Inventor: Robbie J. Adams, Phoenix, AZ (US)

(73) Assignee: Honeywell International, Inc., Morristown, NJ (US)

(*) Notice: Subject to any disclaimer, the term of this patent is extended or adjusted under 35 U.S.C. 154(b) by 241 days.

(21) Appl. No.: 11/292,391

(22) Filed: Nov. 30, 2005

(65) Prior Publication Data

US 2007/0122562 A1    May 31, 2007

(51) Int. Cl.
*B29B 41/02* (2006.01)

(52) U.S. Cl. .............. 264/40.1; 264/401; 264/308; 425/143; 425/144; 425/375

(58) Field of Classification Search .............. None
See application file for complete search history.

(56) References Cited

U.S. PATENT DOCUMENTS

| | | | |
|---|---|---|---|
| 5,222,652 A | 6/1993 | Gibbs et al. | |
| 5,402,351 A | 3/1995 | Batchelder et al. | |
| 5,510,066 A | 4/1996 | Fink et al. | |
| 5,597,589 A * | 1/1997 | Deckard ............. | 425/174.4 |
| 5,866,058 A | 2/1999 | Batchelder et al. | |
| 6,127,643 A | 10/2000 | Unde | |
| 6,153,142 A | 11/2000 | Chari et al. | |
| 6,162,378 A | 12/2000 | Bedal et al. | |
| 6,193,923 B1 | 2/2001 | Leyden et al. | |
| 6,401,001 B1 | 6/2002 | Jang et al. | |
| 6,680,456 B2 | 1/2004 | Adams | |
| 6,689,252 B1 | 2/2004 | Shamouilian et al. | |
| 6,792,326 B1 | 9/2004 | Duignan | |
| 2003/0075836 A1 | 4/2003 | Fong | |
| 2005/0173380 A1* | 8/2005 | Carbone ............. | 219/121.31 |

* cited by examiner

*Primary Examiner*—Mary Lynn Theisen
(74) *Attorney, Agent, or Firm*—Ingrassia Fisher & Lorenz

(57) ABSTRACT

A solid free form fabrication system for manufacturing a component by successively building feedstock layers representing successive cross-sectional component slices includes a platform for receiving and supporting the feedstock layers, a feedstock supplying apparatus that deposits the feedstock into a predetermined region to form the feedstock layers, an energy source directed toward the predetermined region to modify the feedstock in the predetermined region and thereby manufacture the component, and a temperature control block disposed on the platform and directly in contact with the deposited feedstock layers to modify the feedstock temperature while manufacturing the component. A solid free form fabrication method uses the system to manufacture the component from the feedstock material

20 Claims, 3 Drawing Sheets

SOLID-FREE-FORM FABRICATION PROCESS AND APPARATUS INCLUDING IN-PROCESS WORKPIECE COOLING

TECHNICAL FIELD

The present invention relates to the fabrication of parts and devices, and more particularly relates to solid free-form fabrication processes that create parts and devices by selectively applying feedstock material to a substrate or an in-process workpiece.

BACKGROUND

Solid free-form fabrication (SFF) is a designation for a group of processes that produce three dimensional shapes from additive formation steps. SFF does not implement any part-specific tooling. Instead, a three dimensional component is often produced from a graphical representation devised using computer-aided modeling (CAM). This computer representation may be, for example, a layer-by-layer slicing of the component shape into consecutive two dimensional layers, which can then be fed to control equipment to fabricate the part. Alternatively, the manufacturing process may be user controlled instead of computer controlled. Generally speaking, a component may be manufactured using SFF by successively building feedstock layers representing successive cross-sectional component slices. Although there are numerous SFF systems that use different components and feedstock materials to build a component, SFF systems can be broadly described as having an automated platform/positioner for receiving and supporting the feedstock layers during the manufacturing process, a feedstock supplying apparatus that directs the feedstock material to a predetermined region to build the feedstock layers, and an energy source directed toward the predetermined region. The energy from the energy source modifies the feedstock in a layer-by-layer fashion in the predetermined region to thereby manufacture the component as the successive layers are built onto each other.

One recent implementation of SFF is generally referred to as ion fusion formation (IFF). With IFF, a torch such as a plasma, gas tungsten arc, plasma arc welding, or other torch with a variable orifice is incorporated in conjunction with a stock feeding mechanism to direct molten feedstock to a targeted surface such as a base substrate or an in-process structure of previously-deposited feedstock. A component is built using IFF by applying small amounts of molten material only where needed in a plurality of deposition steps, resulting in net-shape or near-net-shape parts without the use of machining, molds, or mandrels. The deposition steps are typically performed in a layer-by-layer fashion wherein slices are taken through a three dimensional electronic model by a computer program. A positioner then directs the molten feedstock across each layer at a prescribed thickness.

There are also several other SFF process that may be used to manufacture a component. Direct metal deposition, layer additive manufacturing processes, and selective laser sintering are just a few SFF processes. U.S. Pat. No. 6,680,456, discloses a selective laser sintering process that involves selectively depositing a material such as a laser-melted powdered material onto a substrate to form complex, net-shape objects. In operation, a powdered material feeder provides a uniform and continuous flow of a measured amount of powdered material to a delivery system. The delivery system directs the powdered material toward a deposition stage in a converging conical pattern, the apex of which intersects the focal plane produced by a laser in close proximity to the deposition stage. Consequently, a substantial portion of the powdered material melts and is deposited on the deposition stage surface. By causing the deposition stage to move relative to the melt zone, layers of molten powdered material are deposited. Initially, a layer is deposited directly on the deposition stage. Thereafter, subsequent layers are deposited on previous layers until the desired three-dimensional object is formed as a net-shape or near net-shape object. Other suitable SFF techniques include stereolithography processes in which a UV laser is used to selectively cure a liquid plastic resin.

When building a component using any SFF process, an increase in the workpiece temperature may cause the workpiece to oxidize. An uncontrolled increase in temperature may also cause an undesirable increase in the workpiece grain size. Deposits that are coated with oxides may have relatively low ductility and fatigue strength. In addition, excessive heat may cause large columnar grains. Small equiaxed grains usually have higher strength at lower temperature and are often more isotropic than large columnar grains.

Hence, there is a need for SFF processes such as IFF that include a mechanism for inducing high cooling rates after heated feedstock is deposited onto a targeted surface to form a workpiece. There is a further need for a mechanism that controls the cooling rates in order to optimize grain size and thereby improve the workpiece strength and ductility.

BRIEF SUMMARY

The present invention provides a solid free form fabrication system for manufacturing a component by successively building feedstock layers representing successive cross-sectional component slices. The system comprises a platform for receiving and supporting the feedstock layers, a feedstock supplying apparatus that deposits the feedstock into a predetermined region to form the feedstock layers, an energy source directed toward the predetermined region to modify the feedstock in the predetermined region and thereby manufacture the component, and a temperature control block disposed on the platform and directly in contact with the deposited feedstock layers to modify the feedstock temperature while manufacturing the component.

The present invention also provides a solid free form fabrication method for manufacturing a component from a feedstock material. First, successive feedstock layers are formed by depositing the feedstock material into a predetermined region on a platform, the feedstock layers representing successive cross-sectional component slices. While depositing the feedstock, an energy source is directed to the predetermined region to modify the feedstock as it is deposited to thereby form the component. The temperature of the component being is controlled during the method by contacting the feedstock layers with a temperature control block that is disposed on the platform.

Other independent features and advantages of the preferred apparatus and method will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention. For example, although much of the following description of in-process workpiece cooling relates to an IFF apparatus and method, there is no intention to limit the invention to that or any other particular SFF process. Rather, although FIGS. 1 to 3 are directed to an IFF apparatus, in-process workpiece cooling may be performed in substantially the same manner by incorporating the subsequently discussed temperature controlling concepts into other SFF systems.

Figure 1:
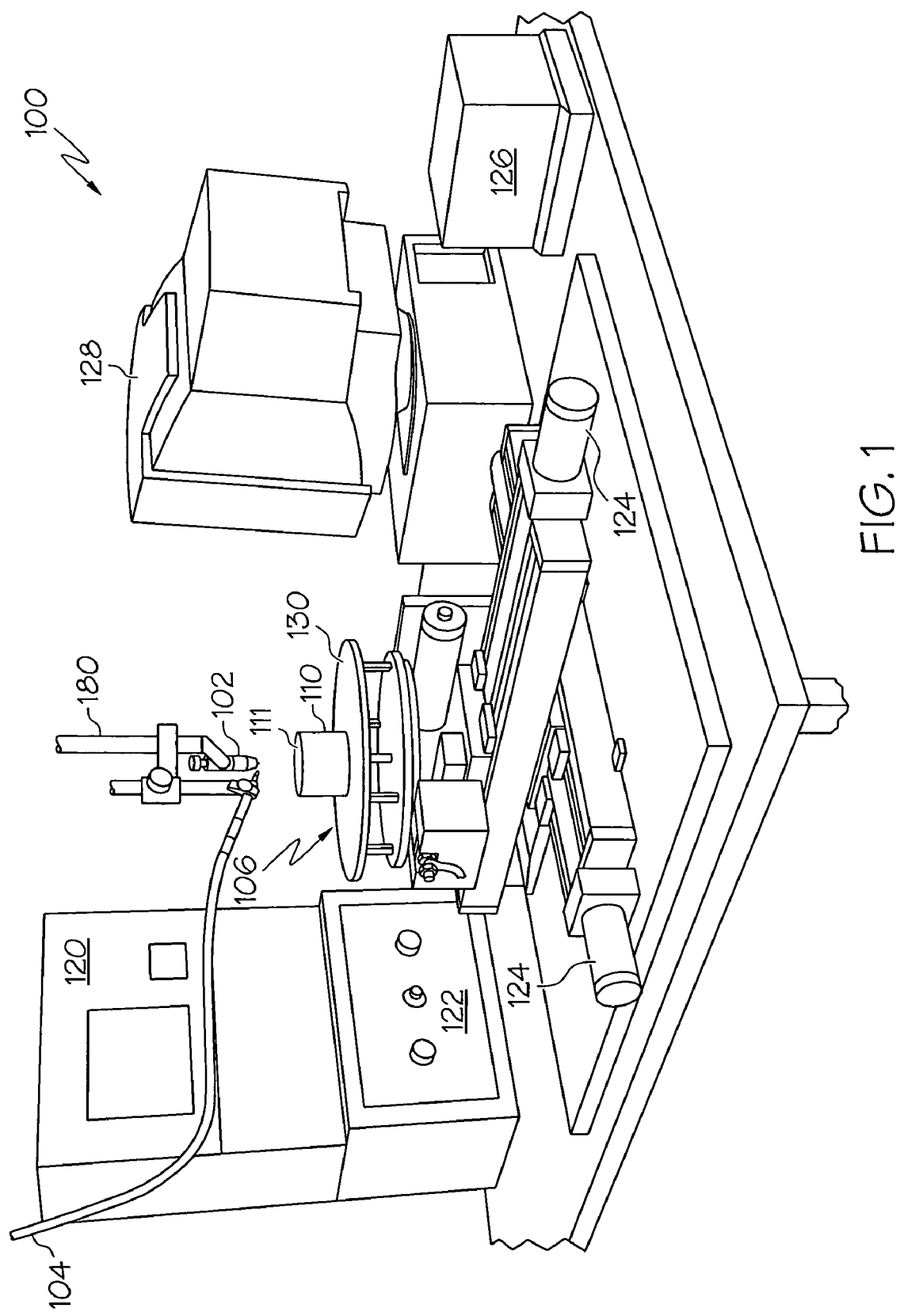
FIG. 1 is a perspective view of an IFF system according to an embodiment of the invention.

FIG. 1 is a perspective view of an IFF system 100, which includes a torch 102 that functions in cooperation with a wire feed mechanism 104 and a positioning system 106 to build up a workpiece in a continuous or layer-by-layer manner. The positioning system 106 continuously positions and repositions the workpiece in a manner whereby feedstock material may be added to it through the wire feed mechanism 104 at predetermined deposition points. Further, the positioning system 106 may also be configured to coordinate movement and control of the torch 102 and the wire feed mechanism 104 together with the workpiece to fabricate three-dimensional articles in a predictable, highly selectable, and useful manner. Control of the positioning system 106 may be achieved by computer-implemented control software or the like. The coordinated torch 102, wire feed mechanism 104, and positioning system 106 provide a highly flexible, manually adaptable, and spontaneously constructible automated system through which components may be fabricated to net or near-net shape.

Additional elements depicted in FIG. 1 include a gas controller 120 that controls gas and/or fluid flow to the torch 102, which is preferably a plasma welding torch. A plasma or arc power source 122 supplies the necessary power to the torch 102. Positioners and/or positioning motors 124 are supplied with positioning signals from an electric drive 126 that is coupled to a computer 128 or other controlling device.

Figure 2:
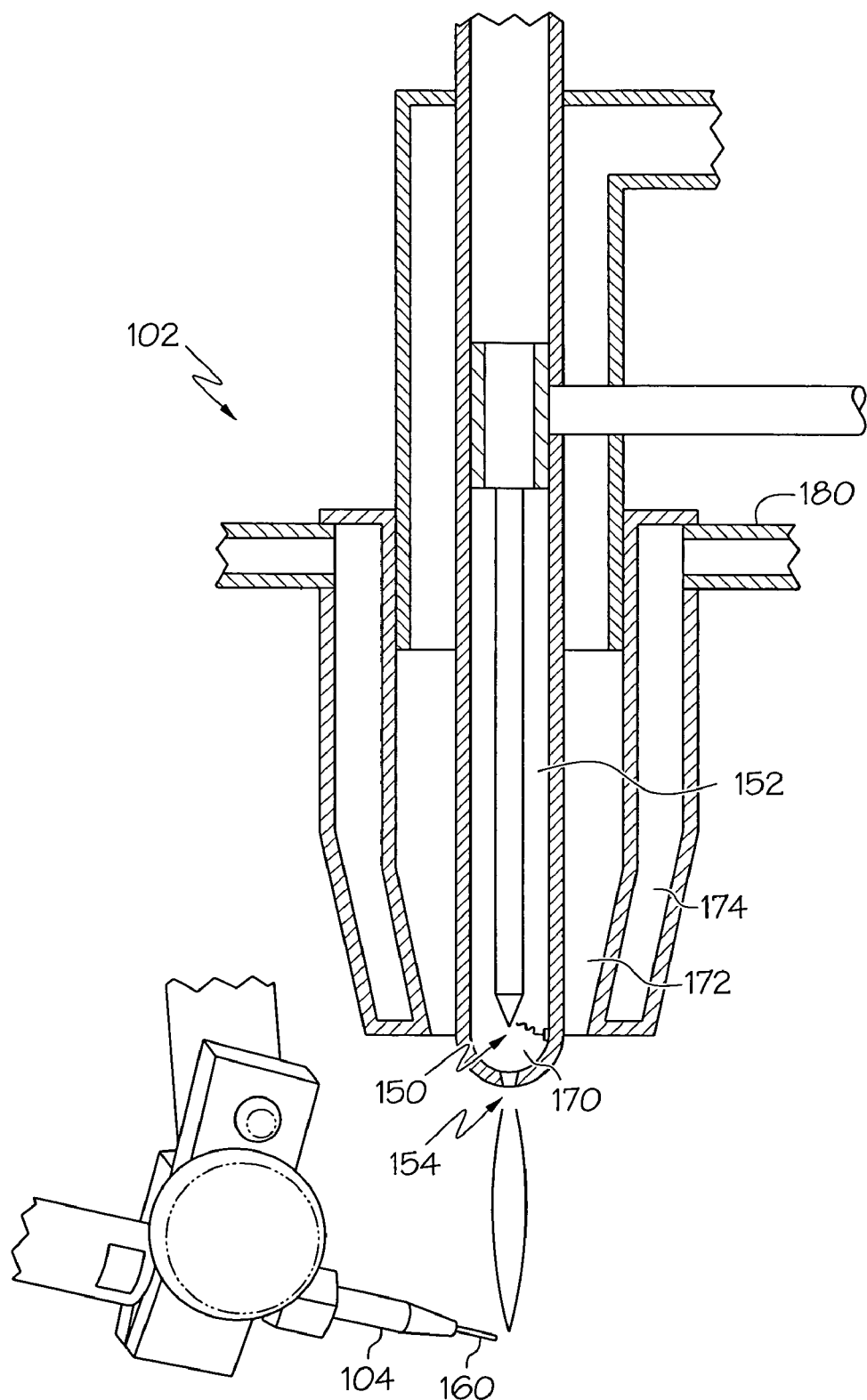
FIG. 2 is a cross-sectional view of a torch from an IFF system, the torch functioning in cooperation with a wire feed mechanism, which is depicted in a perspective view.
Figure 3:
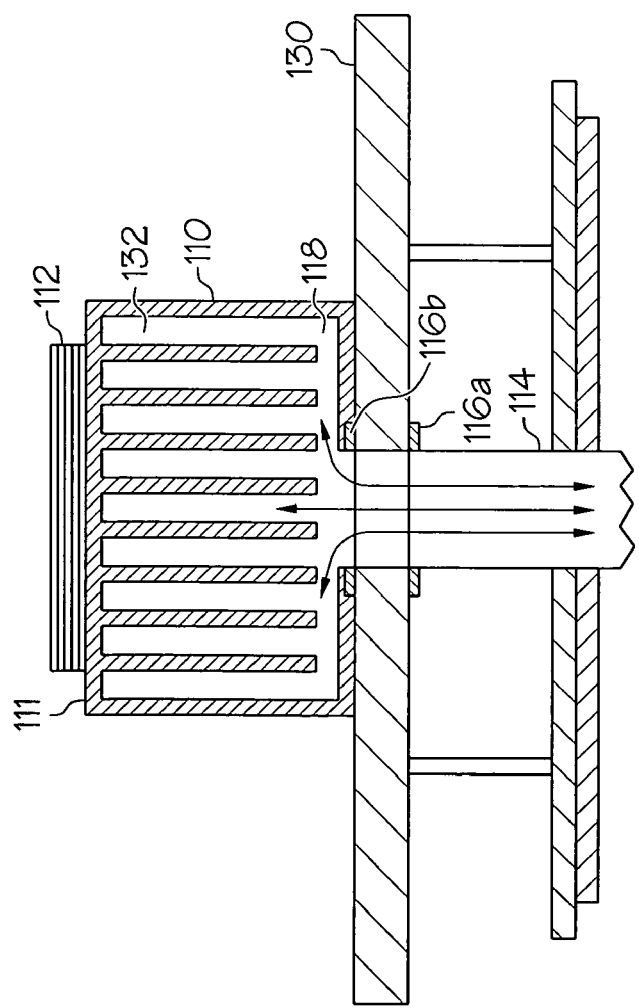
FIG. 3 is a cross-sectional view of a workpiece mounted on a rotating workstation table that includes a fluid-cooled heat extraction block for in-process workpiece cooling.

A cross-sectional view of the torch 102 is depicted in detail in FIG. 2 in cooperation with a wire feed mechanism 104. An arc electrode 150 is positioned near a nozzle 154 and inside a gas flow channel 152, and operates to ionize a gas and create a hot argon plasma in region 170 before the gas exits the nozzle 154. Upon being energized, the argon gas rapidly accelerates from the nozzle 154 toward the workpiece. The wire feed mechanism 104 introduces feedstock 160 between the nozzle 154 and the workpiece. In an exemplary embodiment, the workpiece is included in an electrical circuit including the ionized gas in order to accelerate and attract the ions from the nozzle 154. The workpiece may be charged by applying a voltage that is opposite of the charge generally present in the ionized plasma gas. The ionized gas is then electrically attracted to the workpiece. Use of such electrical charge in the workpiece may also serve to control the direction and distribution of the ionized plasma gas. The degree of attraction between the ions and the workpiece may be controlled by increasing or decreasing the charge present on the workpiece.

A noble gas such as argon is preferably ionized using the arc electrode 150, although alternative inert gases, ions, molecules, or atoms may be used in conjunction with the torch 102 instead of argon. These alternative mediators of the plasma energy may include positive and/or negative ions, or electrons alone or together with ions. Further, reactive elements may be combined with an inert gas such as argon to optimize performance of the torch 120. The plasma generating process so energizes the argon gas that the gas temperature is raised to between 5,000 and 30,000K. Consequently, only a small volume of energized argon gas is required to melt feedstock 160 from the wire feed mechanism 104. Nozzles of varying apertures or other orifices may be used to provide specific geometry and plasma collimation for the fabrication of different components. Direct beam nozzle orifices may contrast with nozzles having a fan shape or other shapes.

The ionized argon plasma, and all other ionized noble gases, has strong affinity for electrons and will obtain them from the surrounding atmosphere unless the atmosphere consists of gases having equal or higher electron affinity. One advantage of the exemplary IFF system depicted in the drawings does not require a pressurization chamber or other chamber in which the ambient gas is controlled. However, to prevent the ionized argon plasma from obtaining electrons and/or ions from the surrounding atmosphere, i.e. from nitrogen and oxygen typically present in ambient environments, the ionized argon plasma is sheathed or protected by a curtain of helium, another noble gas, or other inert gases flowing from the nozzle from a coaxial channel 172. Helium and other noble gases hold their electrons with a high degree of affinity, and are less susceptible than oxygen or nitrogen to having its electrons taken by the ionized argon plasma.

Collisions between the energetic argon atom and the nozzle 154 may substantially heat and damage the nozzle if left unchecked. To cool the nozzle 154, water or another cooling fluid is circulated in a cooling chamber 174 that surrounds the nozzle 154. A gas and water flow line 180 leads into the cooling chamber 174.

Any material susceptible to melting by an argon ion or other plasma beam may be supplied using a powder feed mechanism or the wire feed mechanism 104 as feedstock 160. Such materials may include steel alloys, aluminum alloys, titanium alloys, nickel alloys, although numerous other materials may be used as feedstock depending on the desired material characteristics such as fatigue initiation, crack propagation, post-welding toughness and strength, and corrosion resistance at both welding temperatures and those temperatures at which the component will be used. Specific operating parameters including plasma temperatures, build materials, melt pool parameters, nozzle angles and tip configurations, inert shielding gases, dopants, and nozzle coolants may be tailored to fit an IFF process. U.S. Pat. No. 6,680,456 discloses an IFF system and various operating parameters, and is hereby incorporated herein by reference.

As previously discussed, when building a component using IFF or any SFF process, a process-related increase in the workpiece temperature may cause the workpiece to oxidize. An uncontrolled increase in temperature may also cause an undesirable increase in the workpiece grain size and/or other reactions. Deposits that are coated with oxides may have relatively low ductility and fatigue strength, and may also have large columnar grains. Small equiaxed grains usually have higher strength at lower temperature and are often more isotropic than large columnar grains. Although large grains tend to have increased creep resistance, the deposited feedstock grain growth should be controlled to optimize the overall workpiece properties.

In order to prevent oxide formation and also control the workpiece grain size, the workpiece temperature is controlled using a heat extraction block. FIG. 1 depicts an exemplary heat extraction block 110 that is situated on a platform 130 that is part of the workpiece positioning system 106. The exemplary heat extraction block 110 is simply a dense monolithic solid object that is adapted to support a workpiece being built using a SFF process. According to the depicted embodiment, the heat extraction block 110 has an upper surface 111 on which a workpiece rests as it is built. The heat extraction block 110 is preferably adapted to provide maximum physical contact with the workpiece to effectively function as an in-process heat absorbing block. More particularly, the heat extraction block 110 is made from a highly heat conducting and absorbing material, preferably a metal such as copper, aluminum, or silicon carbide, and consequently draws heat from the workpiece. Although the heat extraction block 110 is depicted as a large cylinder in FIG. 1, it may be larger, smaller, or differently shaped. The upper surface 111 that supports and contacts a workpiece is preferably flat in order to provide a horizontal and planar surface on which layers are iteratively built up to form the workpiece. However, the surface 111 may be otherwise shaped and sized to fit a specific process or workpiece.

FIG. 3 is a cross-sectional view of a workpiece mounted on a rotating workstation table that includes another exemplary heat extraction block 110. In this embodiment, the cooling block is not a dense solid object although it may be formed from a dense solid material. Rather, the heat extraction block 110 includes a manifold 118 that distributes a cooling fluid through the heat extraction block 110 for in-process workpiece cooling. A workpiece 112 being formed by a SFF process is positioned on the heat extraction block 110, which in turn is positioned on the platform 130. The manifold 118 inside the heat extraction block 110 distributes the cooling fluid to a plurality of fluid passages 132 that are formed in the block 110. The fluid passages 132 are configured to bring the cooling fluid into close proximity with the outer surface 111 that supports the workpiece 112, and thereby create a large temperature disparity between the workpiece 112 and the heat extraction block 110, particularly near the outer surface 111.

The manifold 118 is in communication with a fluid port 114. In an exemplary embodiment, the fluid port 114 is formed through the platform 130 and consequently does not impede lateral or rotational movement of the platform 130 during the SFF process. Seals 116a and 116b are included at interfaces between the fluid port 114, the platform 130, and the heat extraction block 110 to prevent cooling fluid leakage. The cooling fluid is preferably a liquid that is substantially colder than the temperature control block 110, although it may be a stream of cold gas. Although the cooling liquid may be as basic as water, some exemplary cooling liquids include glycol, glycol/water mixtures, and other alcohols, although preferred cooling liquids include liquids that are only liquid at temperatures substantially below room temperature (23° C.) such as liquid nitrogen or helium.

Figure 4:
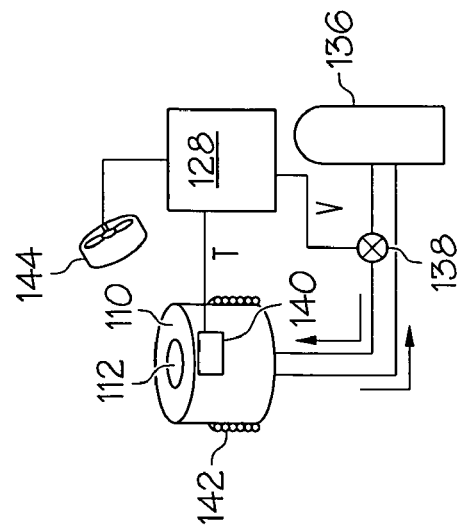
FIG. 4 is a block diagram depicting a fluid-cooled heat extraction block for in-process workpiece cooling, and a cooling fluid circulation control system.

FIG. 4 is a block diagram depicting the fluid-cooled heat extraction block for in-process workpiece cooling, and an exemplary cooling fluid circulation control system. A fluid reservoir 136 circulates pressurized fluid through the heat extraction block 110. Also, the manifold 118 may be supplemented with or substituted by fluid circulation coils 142 that receive fluid from the reservoir 136 and contacts a portion of a surface defining the heat extraction block exterior to cool the block 110. Further, either or both of the manifold 118 and the fluid coils 142 may be connected to a heated fluid reservoir for rapidly heating the block 110, for instance if it is desirable for the workpiece 112 to have increased grain size. Electrical resistance is another heating means that the block 110 may incorporate.

A valve 138, including valve opening and closing actuators, regulates fluid flow to the block 110 and thereby regulates the heat extraction block temperature to create a temperature disparity between the block 110 and the workpiece 112. A sensor 140 such as a temperature sensor is coupled to the heat extraction block 110 and transmits temperature data T to the computer 128 depicted in FIG. 1, or to another processor. Other sensors such as an IR sensor, an optical scanner, or a thermoelectrical sensor may be used. Depending on the size and materials for the workpiece being built and its desired properties, such as grain size and oxygen or other impurity concentration, the computer 128 is programmed with instructions for a targeted heat extraction block temperature. The computer 128 is configured to receive the temperature data T from the sensor 140, and is responsive thereto to manipulate the fluid circulation by transmitting valve control data V to the valve 138. Valve opening and closing actuators respond to the valve control data to increase or decrease the cooling fluid volume to the heat extraction block 110. In addition, the computer 128 may be configured to manipulate a fan 144 that provides a column of cooled air or other ambient gas to the workpiece 112 in response to the temperature data to provide additional cooling. Also, the computer 128 may be configured to manipulate heated fluid circulation in the same manner as the cooling fluid, or to activate a voltage source and heat the block 110 by electrical resistance, or to manipulate an energy source such as a microwave source, a laser source, or an ion plasma source for heating the component.

Thus, the cooling fluid circulation control system provides a mechanism for inducing high cooling and heating rates after heated feedstock is deposited onto the heat extraction block surface 111 to form a workpiece. The system also provides a mechanism for managing the workpiece cooling and heating in order to optimize oxidation and grain size and thereby improve the workpiece strength and ductility.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A solid free form fabrication system for manufacturing a component by successively building feedstock layers representing successive cross-sectional component slices, the system comprising:
   a platform for receiving and supporting the feedstock layers;
   a feedstock supplying apparatus that deposits the feedstock into a predetermined region to form the feedstock layers;
   an energy source directed toward the predetermined region to modify the feedstock in the predetermined region and thereby manufacture the component; and
   a temperature control block disposed on the platform and directly in contact with the deposited feedstock layers to modify the feedstock temperature while manufacturing the component.

2. The solid free form fabrication system of claim 1, wherein the system is an ion fusion formation system, the energy source is a plasma torch positioned to emit a plasma stream in a plasma path, and the feedstock supplying apparatus is operably configured to direct the feedstock into the plasma path and to the predetermined region to form the feedstock layers.

3. The solid free form fabrication system of claim 1, wherein the temperature control block is formed from a metal selected from the group consisting of copper, aluminum, and silicon carbide.

4. The solid free form fabrication system of claim 1, further comprising:
   a fluid reservoir containing a fluid; and
   a fluid circulation channel in fluid communication with the fluid reservoir, and adapted to change the temperature of the temperature control block using the fluid.

5. The solid free form fabrication system of claim 4, wherein the fluid circulation channel includes at least one fluid passage formed inside the temperature control block.

6. The solid free form fabrication system of claim 4, wherein the fluid circulation channel includes at least one fluid circulation coil that contacts the control block exterior.

7. The solid free form fabrication system of claim 4, further comprising:
   a temperature sensor that measures the control block temperature and transmits temperature data representative thereof; and
   a processor that receives the temperature data and, responsive thereto, regulates fluid flow from the fluid reservoir to the fluid circulation channel.

8. The solid free form fabrication system of claim 4, wherein the fluid is a liquid that is substantially cooler than the ambient temperature surrounding the temperature control block.

9. The solid free form fabrication system of claim 4, wherein the fluid is a liquid that is substantially hotter than the ambient temperature surrounding the temperature control block.

10. The solid free form fabrication system of claim 1, further comprising:
    a fan that blows a column of a gas onto the deposited feedstock layers while manufacturing the component.

11. The solid free form fabrication system of claim 1, wherein the temperature control block is heated by electrical resistance.

12. The solid free form fabrication system of claim 1, further comprising an energy source that directs radiation onto the deposited feedstock layers while manufacturing the component.

13. A solid free form fabrication method for manufacturing a component from a feedstock material, the method comprising:
    forming successive feedstock layers by depositing the feedstock material into a predetermined region on a platform, the feedstock layers representing successive cross-sectional component slices;
    modifying the feedstock by directing an energy source to the predetermined region and thereby forming the component; and
    controlling the temperature of the component being formed by contacting the feedstock layers with a temperature control block disposed on the platform.

14. The solid free form fabrication method of claim 13, performed using an ion fusion formation system, wherein the energy source is a plasma torch positioned to emit a plasma stream in a plasma path, and the feedstock is directed into the plasma path and to the predetermined region to form the feedstock layers.

15. The solid free form fabrication method of claim 13, further comprising:
    adjusting the temperature of the temperature control block using a fluid circulation channel that receives a pressurized fluid from a fluid reservoir.

16. The solid free form fabrication method of claim 14, wherein the fluid circulation channel includes at least one fluid passage formed inside the temperature control block.

17. The solid free form fabrication method of claim 14, wherein the fluid circulation channel includes at least one fluid circulation coil that contacts the control block exterior.

18. The solid free form fabrication method of claim 15, further comprising:
    measuring the control block temperature; and
    automatically regulating flow from the fluid reservoir to the fluid circulation channel in response to the measured control block temperature.

19. The solid free form fabrication method of claim 13, further comprising:
    blowing a column of a gas onto the deposited feedstock while manufacturing the component.

20. The solid free form fabrication method of claim 13, further comprising:
    directing radiation from an energy source onto the deposited feedstock layers while manufacturing the component.

* * * * *